(12) United States Patent
Fukata

(10) Patent No.: US 8,947,553 B2
(45) Date of Patent: Feb. 3, 2015

(54) IMAGE PROCESSING DEVICE AND IMAGE PROCESSING METHOD

(71) Applicant: Sony Corporation, Tokyo (JP)

(72) Inventor: Yoko Fukata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/043,964

(22) Filed: Oct. 2, 2013

(65) Prior Publication Data

US 2014/0029799 A1 Jan. 30, 2014

Related U.S. Application Data

(63) Continuation of application No. 13/109,281, filed on May 17, 2011, now Pat. No. 8,643,740.

(30) Foreign Application Priority Data

Jul. 2, 2010 (JP) ................................. 2010-151951

(51) Int. Cl.
*H04N 5/228* (2006.01)
*G06T 7/00* (2006.01)
*G06K 9/00* (2006.01)
*G06K 9/32* (2006.01)
*H04N 5/232* (2006.01)

(52) U.S. Cl.
CPC .......... *G06T 7/0044* (2013.01); *G06K 9/00228* (2013.01); *G06K 9/3241* (2013.01); *H04N 5/23216* (2013.01); *H04N 5/23219* (2013.01); *H04N 5/23293* (2013.01)

USPC ................ 348/222.1; 348/223.1; 348/333.01; 348/333.08

(58) Field of Classification Search
CPC ........................ G06K 9/00228; G06K 9/00288
See application file for complete search history.

(56) References Cited

U.S. PATENT DOCUMENTS

| 8,294,813 | B2 * | 10/2012 | Kawaguchi et al. | .......... 348/371 |
| 2008/0181460 | A1 * | 7/2008 | Tamaru | ......................... 382/103 |
| 2009/0002516 | A1 | 1/2009 | Suzuki et al. | |

FOREIGN PATENT DOCUMENTS

JP 2006-101186 4/2006

* cited by examiner

*Primary Examiner* — Yogesh Aggarwal
(74) *Attorney, Agent, or Firm* — Oblon, Spivak, McClelland, Maier & Neustadt, L.L.P.

(57) ABSTRACT

An image processing device including a subject frame setting section which, by operating a subject detector which detects a subject captured in an image, sets a subject frame which surrounds a predetermined range of the subject detected from the image; an acceptance frame setting section which sets an acceptance frame with a range wider than the subject frame according to the context of the image; a position detecting section which detects a specified position on an image which is specified by a user; and a recognizing section which recognizes a subject which is a tracking target based on the acceptance frame set by the acceptance frame setting section and the specified position detected by the position detecting section.

10 Claims, 13 Drawing Sheets

FIG. 2
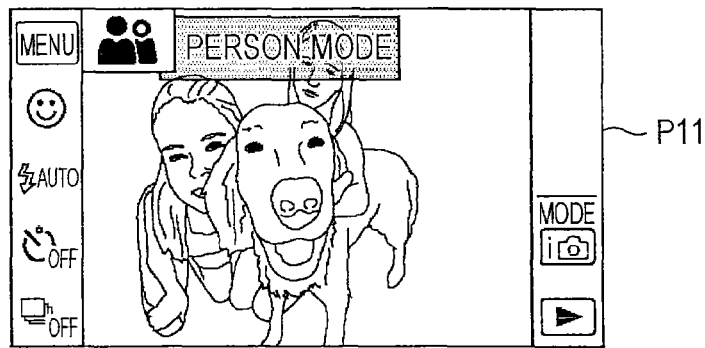
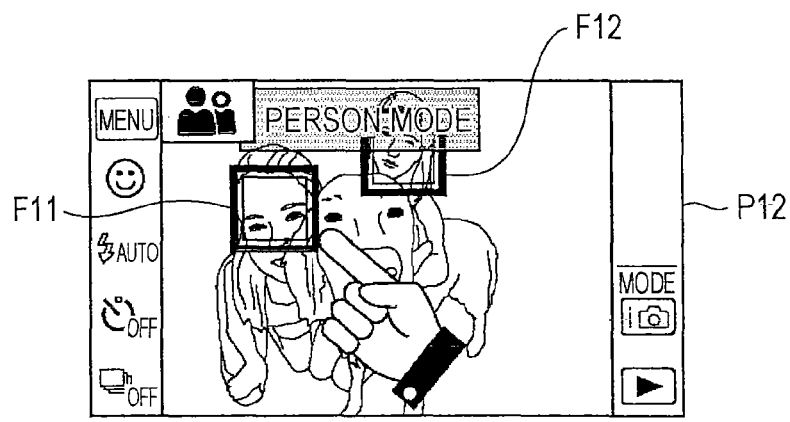

FIG. 3
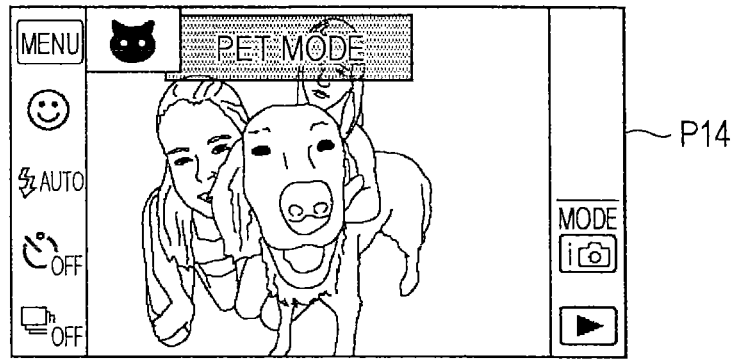
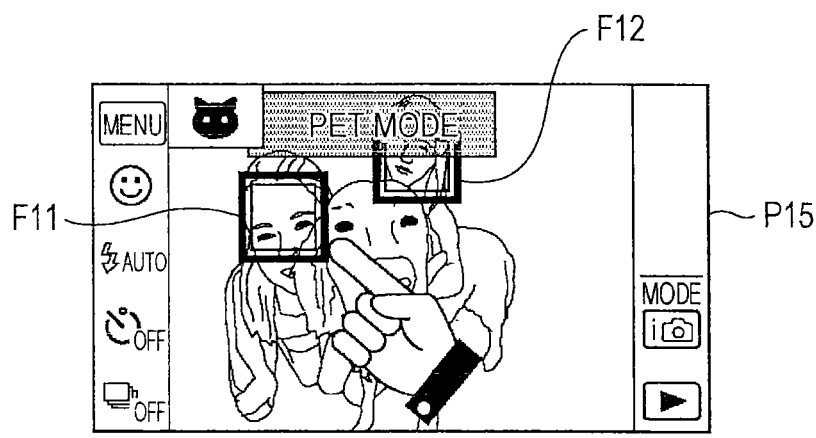
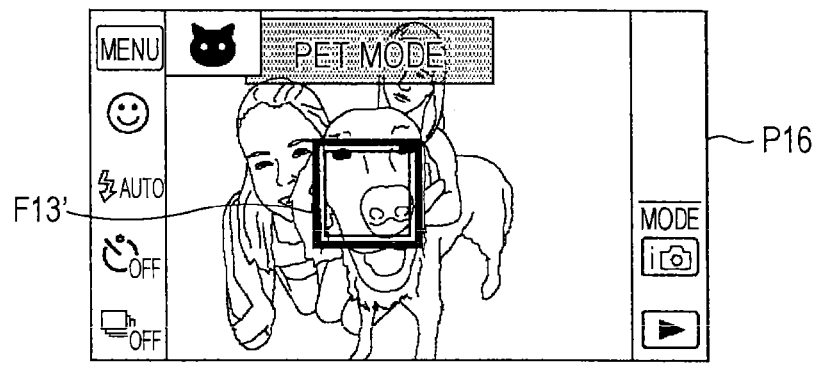

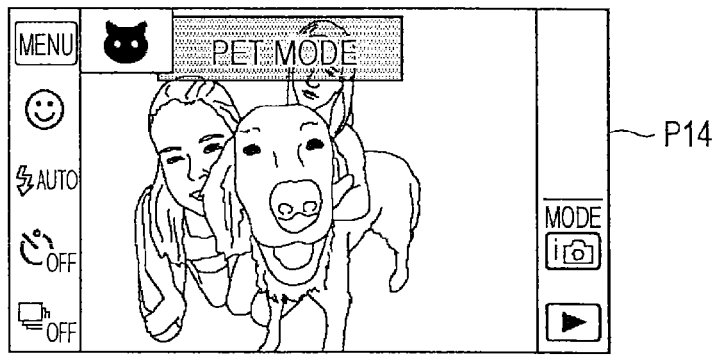
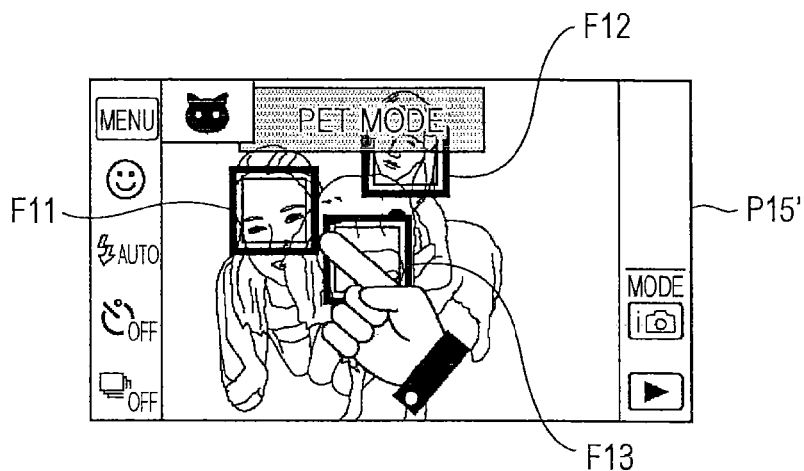
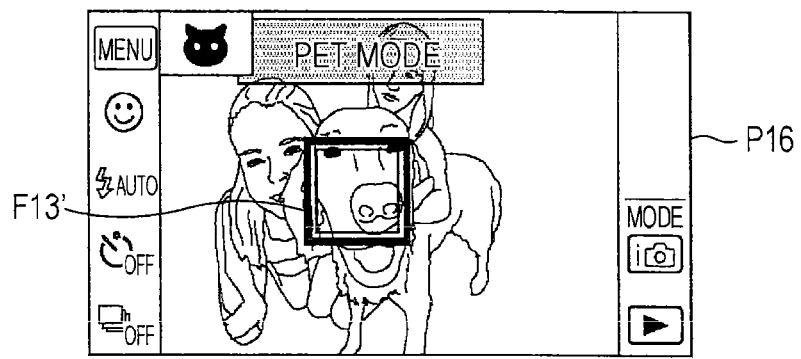
FIG. 4

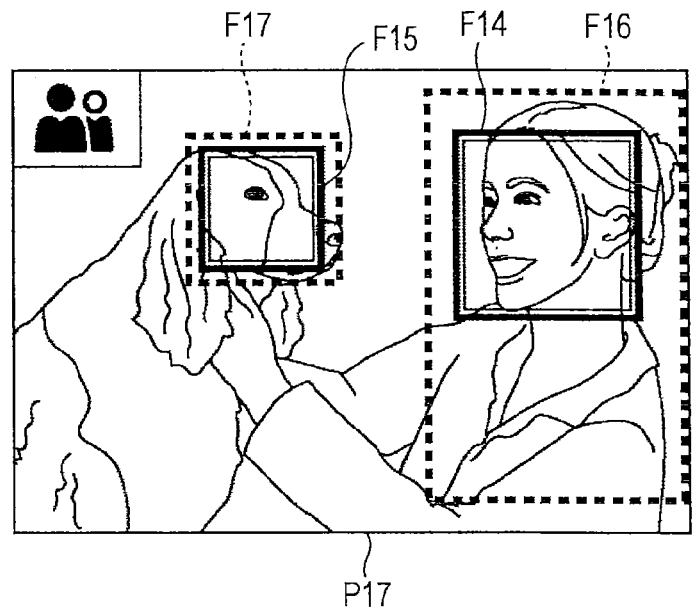
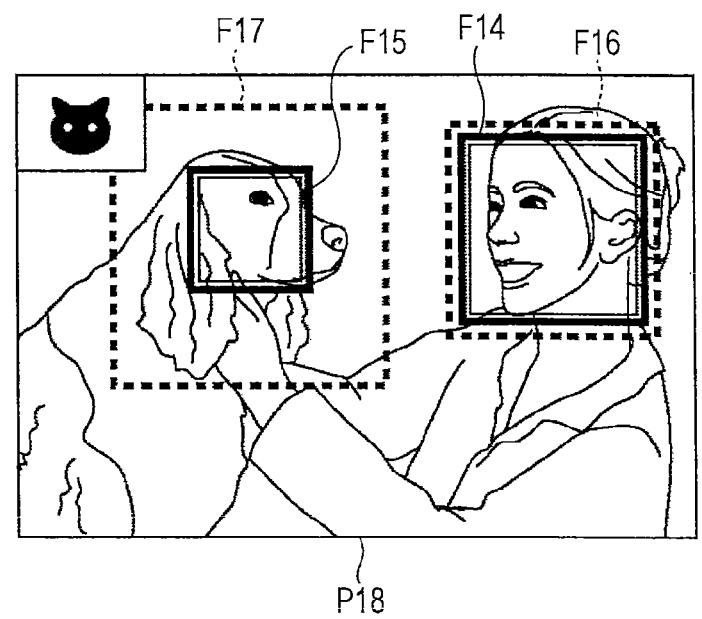
FIG. 5

FIG. 7
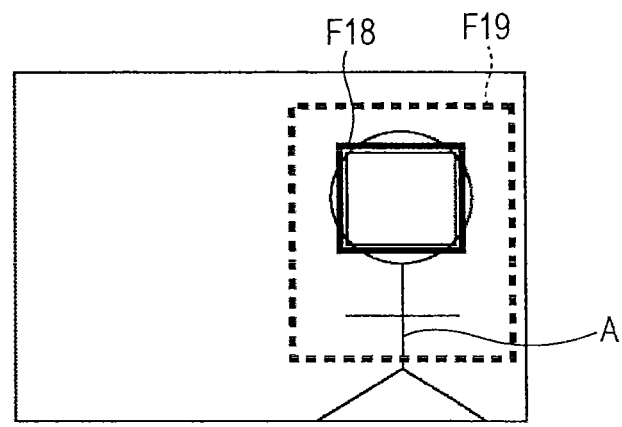
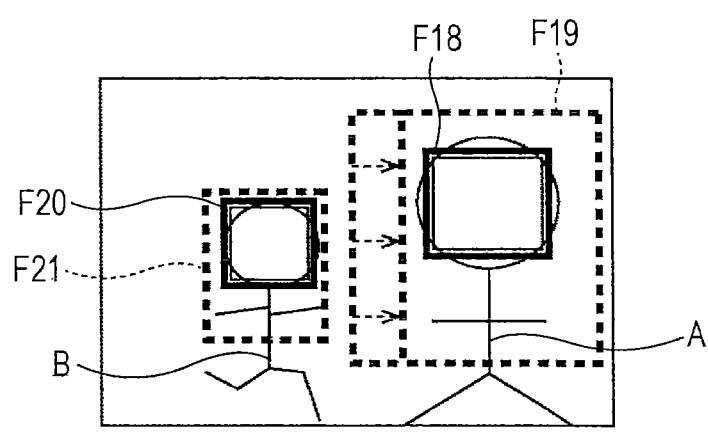
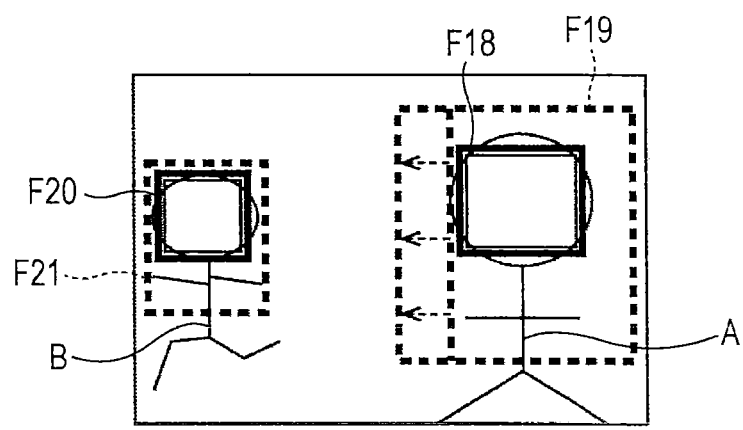

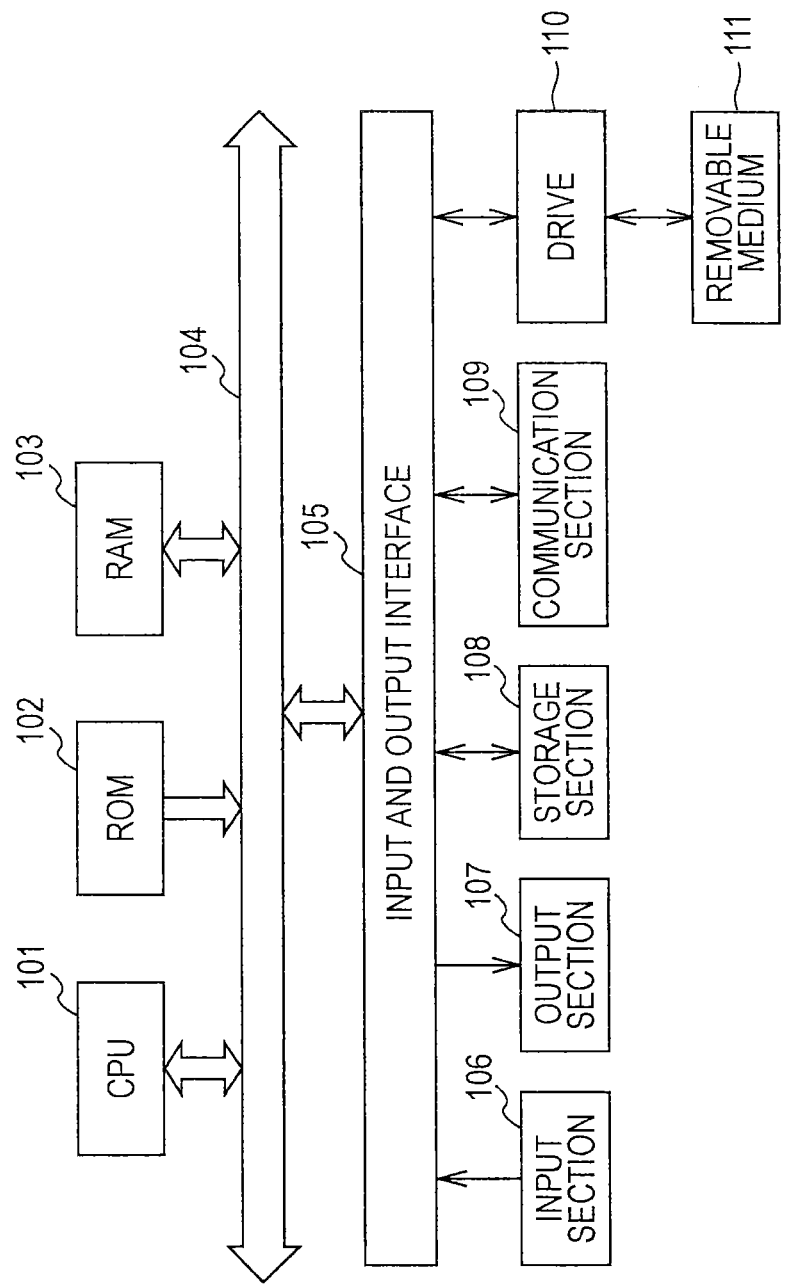

IMAGE PROCESSING DEVICE AND IMAGE PROCESSING METHOD

CROSS-REFERENCE TO RELATED APPLICATIONS

This application is a continuation of and is based upon and claims the benefit of priority Under 35 U.S.C. §120 for U.S. Ser. No. 13/109,281, filed May 17, 2011, and claims the benefit of priority under 35 U.S.C. §119 from Japanese Patent Application No. 2010-151951, filed Jul. 2, 2010. The entire contents of which are incorporated herein by reference.

BACKGROUND

The present disclosure relates to an image processing device and an image processing method, and in particular to an image processing device and an image processing method where it is possible to recognize a subject which is a tracking target with precision.

In the past, in digital still cameras, digital video cameras, and the like (referred to appropriately below as digital cameras), a function for tracking a subject such as the face of a certain person selected by a user or an object other than a face was mounted. Then, it is possible to continuously maintain various parameters (for example, focus, brightness, and the like) of the digital camera to be optimal according to the state of the position of a tracking subject.

As a method for the user to select a subject to be photographed using a digital camera, there is a method for selecting by touching a subject displayed on a touch panel, a method for selecting using a guide frame for matching a subject with the angle of view in advance, and the like.

For example, in Japanese Unexamined Patent Application Publication No. 2006-101186, an imaging device is disclosed in which, when the user wants to track a subject other than a face, a dedicated mode in which it is possible to detect the subject is set to operate, and a subject tracking function is enabled.

SUMMARY

However, in the digital camera in the related art, if the user is not able to accurately designate the subject which is the tracking target, it is difficult for the subject which is intended by the user to be recognized with precision.

It is desirable to be able to recognize a subject which is a tracking target with precision.

An image processing device according to an embodiment of the disclosure is provided with a subject frame setting section which, by operating a subject detector which detects a subject captured in an image, sets a subject frame which surrounds a predetermined range of the subject detected from the image; an acceptance frame setting section which sets an acceptance frame with a range wider than the subject frame according to the context of the image; a position detecting section which detects a specified position on an image which is specified by a user; and a recognizing section which recognizes a subject which is a tracking target based on the acceptance frame set by the acceptance frame setting section and the specified position detected by the position detecting section.

An image processing method according to the embodiment of the disclosure includes setting, by operating a subject detector which detects a subject captured in an image, a subject frame which surrounds a predetermined range of the subject detected from the image; setting an acceptance frame with a range wider than the subject frame according to the context of the image; detecting a specified position on an image which is specified by a user; and recognizing a subject which is a tracking target based on the acceptance frame and the specified position.

According to the embodiment of the disclosure, the subject frame which surrounds the predetermined range of the subject detected from the image is set by operating the subject detector which detects the subject captured in the image and the acceptance frame with a range wider than the subject frame is set according to the context of the image. Then, the specified position on the image which is specified by the user is detected and the subject which is the tracking target is recognized based on the acceptance frame and the specified position.

An image processing device according to another embodiment of the disclosure is provided with a subject frame setting section which, by operating a subject detector which detects a subject captured in an image, sets a subject frame which surrounds a predetermined range of the subject detected from the image; an acceptance frame setting section which sets an acceptance frame with a range wider than the subject frame according to an imaging mode set for performing imaging using imaging conditions which are appropriate for a certain image; a position detecting section which detects a specified position on an image which is specified by a user; and a recognizing section which recognizes a subject which is a tracking target based on the acceptance frame set by the acceptance frame setting section and the specified position detected by the position detecting section.

An image processing method according to the other embodiment of the disclosure includes setting, by operating a subject detector which detects a subject captured in an image, a subject frame which surrounds a predetermined range of the subject detected from the image; setting an acceptance frame with a range wider than the subject frame according to an imaging mode set for performing imaging using imaging conditions which are appropriate for a certain image; detecting a specified position on an image which is specified by a user; and recognizing a subject which is a tracking target based on the acceptance frame and the specified position.

According to the other embodiment of the disclosure, the subject frame which surrounds the predetermined range of the subject detected from the image is set by operating the subject detector which detects the subject captured in the image and the acceptance frame with a range wider than the subject frame is set according to the imaging mode set for performing imaging using the imaging conditions which are appropriate for a certain subject. Then, the specified position on the image which is specified by the user is detected and the subject which is the tracking target is recognized based on the acceptance frame and the specified position.

According to the embodiments of the disclosure, it is possible to recognize the subject which is the tracking target with precision.

BRIEF DESCRIPTION OF THE DRAWINGS

FIG. 2 is a diagram illustrating a screen example when an imaging mode is a person mode;

FIG. 3 is a diagram illustrating a screen example when an imaging mode is a pet mode;

FIG. 4 is a diagram illustrating another screen example when an imaging mode is a pet mode;

FIG. 5 is a diagram illustrating a setting example of a touch acceptance frame according to an imaging mode;

FIG. 7 is a diagram illustrating a setting example of a touch acceptance frame according to the movement of a subject;

FIG. 13 is a block diagram illustrating a configuration example of a computer according to an embodiment of the disclosure.

DETAILED DESCRIPTION OF EMBODIMENTS

Below, specific embodiments of the disclosure will be described in detail while referring to the diagrams.

Figure 1:
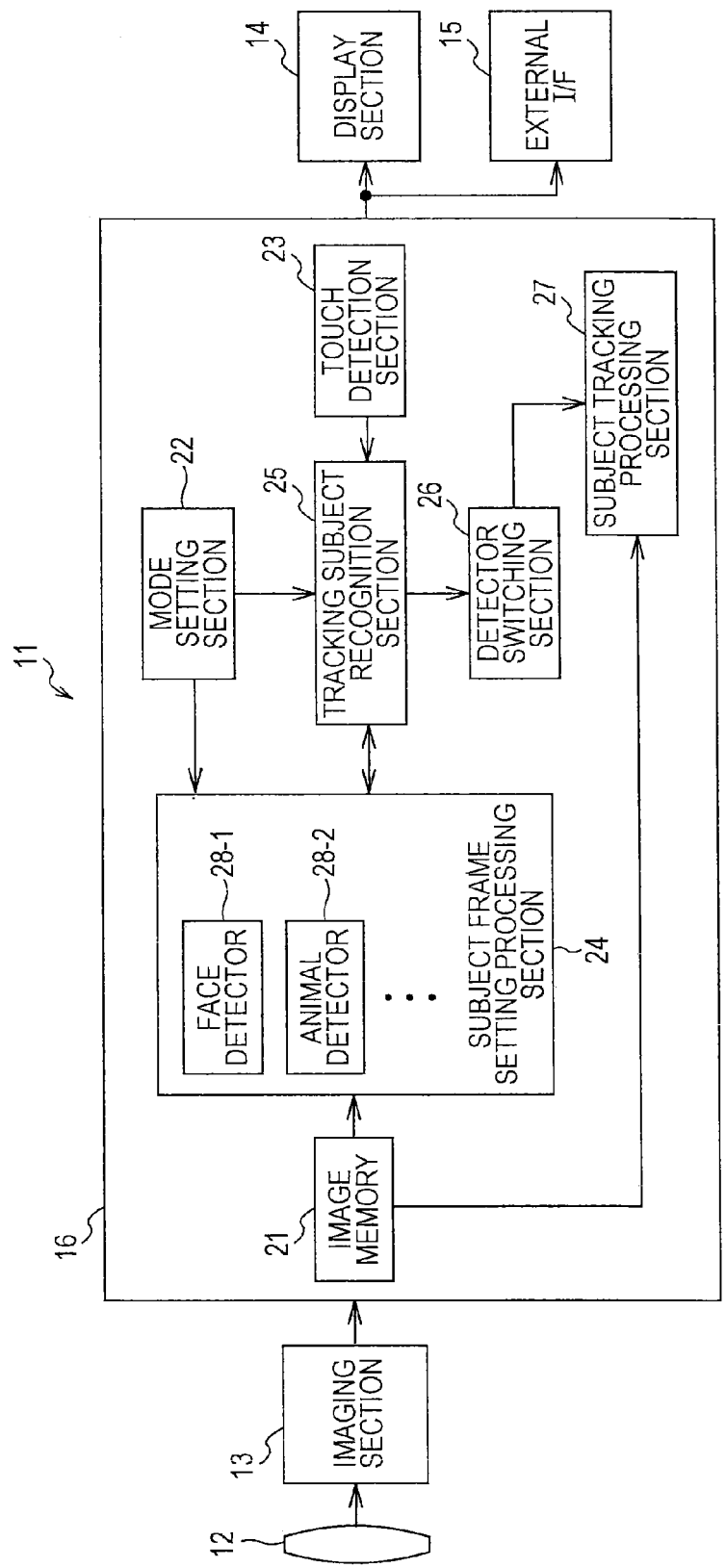
FIG. 1 is a block diagram illustrating a configuration example of a digital camera according to an embodiment of the disclosure.

FIG. 1 is a block diagram illustrating a configuration example of a digital camera according to an embodiment of the disclosure.

In FIG. 1, a digital camera 11 is configured to be provided with a lens 12, an imaging section 13, a display section 14, an external I/F (interface) 15, and an image processing section 16.

The lens 12 is configured by, for example, a group of a plurality of lenses which provided a zoom function and the like, and light from a subject is concentrated and an image of a subject is produced on an imaging surface of an imaging element of the imaging section 13. The imaging section 13 is configured by, for example, a CCD (Charge Coupled Device), a CMOS (Complementary Metal Oxide Semiconductor) sensor, or the like, and images the image of the subject and outputs the image obtained via the imaging to the image processing section 16.

The display section 14 is configured by an LCD (Liquid Crystal Display), an organic EL (Electro Luminescence) display, or the like, and the image which is imaged in the imaging section 13 and output by imaging processing being carried out in the image processing section 16, that is, the image where the subject is surrounded by a subject frame, is displayed. The external I/F 15 is configured by a terminal or the like for outputting the image output from the image processing section 16 to, for example, an external display (not shown).

The image processing section 16 carries out image processing with regard to the image imaged by the imaging section 13 and outputs the image to the display section 14 and the external I/F 15. The image processing section 16 performs image processing where, for example, a subject (for example, a face) which is captured in an image is detected and a subject frame which surrounds a predetermined range of the subject is synthesized in the image. In addition, when an arbitrary subject is selected by a user, the image processing section 16 performs a subject tracking process where the subject is tracked and performs a process where various types of parameters are adjusted so each is optimal when the subject which is a tracking target (referred to below as tracking subject) is imaged.

The image processing section 16 is configured to be provided with an image memory 21, a mode setting section 22, a touch detection section 23, a subject frame setting processing section 24, a tracking subject recognition section 25, a detector switching section 26, and a subject tracking processing section 27.

In the image memory 21, data of the image imaged by the imaging section 13 is sequentially supplied, and the image memory 21 sequentially stores the supplied data of the image.

The mode setting section 22 sets the various types of parameters used in the imaging mode specified by a user. The digital camera 11 is provided with, for example, various imaging modes such as a person mode where imaging is performed using imaging conditions which are appropriate for images of people, a pet mode where imaging is performed using imaging conditions which are appropriate for images of animals, and the like. In addition, the imaging mode which is set in the mode setting section 22 is referenced in processes which are performed by the subject frame setting processing section 24 and the tracking subject recognition section 25.

The touch detection section 23 detects a position (specified position) which is touched when a user touches the screen of the display section 14 based on a signal from a touch panel (not shown) which is installed so as to overlap with the screen of the display section 14. Then, the touch detection section 23 supplies information showing the touch position to the tracking subject recognition section 25.

The subject frame setting processing section 24 has a plurality of detectors which detect a subject captured in an image and performs a subject frame setting process where the size of a subject frame, which surrounds a predetermined range of the subject detected by the detectors, is set. For example, as shown in FIG. 1, the subject frame setting processing section 24 has a face detector 28-1 and an animal detector 28-2 and sets the subject frame with regard to the face of a person detected by the face detector 28-1, the face of an animal detected by the animal detector 28-2, or the like. In addition, the subject frame set by the subject frame setting processing section 24 is synthesized in the image and is displayed in the display section 14.

The tracking subject recognition section 25 recognizes the tracking subject based on the subject frame set by the subject frame setting processing section 24 when the information showing the touch position touched by a user is supplied from the touch detection section 23. For example, the tracking subject recognition section 25 recognizes the subject which is set in the subject frame as the tracking subject if the touch position touched by the user is at an inner side of the subject frame. Then, the tracking subject recognition section 25 supplies the information where the tracking subject is specified to the detector switching section 26 in a case where it is possible to recognize the tracking subject.

The detector switching section 26 recognizes the detector used by the subject frame setting processing section 24 in the detection of the tracking subject via the tracking subject recognition section 25 when the information specifying the tracking subject is supplied from the tracking subject recognition section 25. Then, the detector switching section 26 performs a process of supplying the information specifying the tracking subject to the subject tracking processing section 27 and switching the detector used by the subject tracking processing section 27 in the subject tracking process to the detector used in the detection of the tracking subject.

The subject tracking processing section 27 starts the subject tracking process where the tracking subject which is specified by the information which specifies the tracking subject is tracked using the detector which is switched by the detector switching section 26. According to this, it is possible for the subject tracking processing section 27 to execute the subject tracking process using the detector which is appropriate for the tracking subject.

In addition, in the information specifying the tracking subject, for example, information which shows the position of the tracking subject, information which shows color and luminance of the tracking subject, and the like are included. When the data of the next image is stored in the image memory 21, the subject tracking processing section 27 detects a region, which has color and luminance close to that of the tracking subject in a predetermined region in the vicinity of the position of the tracking subject specified in the previous image, in the next image and specifies the tracking target. Then, the subject tracking processing section 27 repeatedly performs specification of the tracking subject from the image sequentially stored in the image memory 21 based on the position of the tracking subject specified by the image and the color and the luminance of the tracking subject. In this manner, the subject tracking process is performed and the subject tracking processing section 27 adjusts the various types of parameters so that each is optimal when the tracking subject is imaged.

In this manner, in the digital camera 11, the subject which has become the tracking target is recognized by the user touching the screen of the display section 14 and the subject tracking process where the subject is tracked is performed.

Here, for example, in a case where a plurality of the subject frames is set with regard to an image where a plurality of subjects is captured, it is not possible for the tracking subject recognizing section 25 to recognize the tracking subject in a case where the touch position touched by the user is not at an inner side of any of the subject frames. In this case, it is possible for the tracking subject recognizing section 25 to reference the imaging mode set by the mode setting section 22 and recognize the tracking subject.

A process where the tracking subject recognizing section 25 references the imaging mode and recognizes the tracking subject will be described with reference to FIGS. 2 and 3.

Screens P11 to P13 of the display section 14 when the person mode is set as the imaging mode are shown in FIG. 2, and screens P14 to P16 of the display section 14 when the pet mode is set as the imaging mode are shown in FIG. 3. In addition, in the digital camera 11, the face detector 28-1 normally operates in the subject frame setting processing section 24.

As shown in FIG. 2, in the screens P11 to P13 of the display section 14 when the imaging mode is the person mode, an icon showing a person and "person mode" are displayed. Then, when two children and a dog are imaged as the subject shown in screen P11, the subject frame setting processing section 24 sets the subject frame to the faces of the two children detected by the face detector 28-1. According to this, as shown screen P12, a subject frame F11 and a subject frame F12 set in regard to the faces of the two children are displayed.

Here, the position where the user touches the screen of the display section 14 is an outer-side vicinity of the subject frame F11 such as the tip of the finger mark shown in screen P12 and is in the vicinity of the dog. In this case, since the imaging mode is the person mode, the tracking subject recognizing section 25 infers that the subject which the user wants as the tracking target is the person even in an outer side of the subject frame F11, and the face of the child where the subject frame F11 is set is recognized as the tracking subject. According to this, as shown in screen P13, a subject frame F11' for the tracking subject is displayed. The color, size, and the like from the previous subject frame F11 which was recognized as the tracking target is changed and the subject frame F11' for the tracking subject is displayed.

On the other hand, as shown in FIG. 3, in screens P14 to P16 of the display section 14 when the imaging mode is the pet mode, an icon showing an animal and "pet mode" are displayed. In screen P14, an image with the same configuration as screen P11 of FIG. 2 is displayed, and as shown in screen P15, a location which is in an outer-side vicinity of the subject frame F11 and in the vicinity of the dog (the same location as in screen P12 of FIG. 2) is touched by the user.

In this case, since the imaging mode is the pet mode, the tracking subject recognizing section 25 infers that the subject which the user wants as the tracking target is the animal and not the children even in an outer side of the subject frame F11 and the dog is recognized as the tracking subject. According to this, as shown in screen P16, a subject frame F13' for the tracking subject which surrounds a predetermined region of the face of the dog is displayed.

Here, when the imaging mode is the pet mode, both the face detector 28-1 and the animal detector 28-2 operate at the same time. In this manner, in a case where the plurality of detectors in the digital camera 11 operates at the same time, it is possible to display the subject frames with regard to the subjects which are detected by the respective detectors.

That is, as shown in FIG. 4, in screen P15' of the display section 14 when the pet mode is set as the imaging mode, it is possible to display the subject frame also on the face of the dog in the same manner as the faces of the children.

However, in order for the tracking subject recognizing section 25 to determine that the position touched by the user on the screen of the display section 14 is an outer-side vicinity of the subject frame, it is necessary that the region which stipulates the vicinity is determined. As the region, other than setting a wide frame with a constant spacing in a fixed manner with regard to the subject frame, for example, a frame where the spacing changes may be set according to the imaging target, the imaging mode, or the like. In this manner, the frame, where it is acceptable for the subject which is set in the subject frame, to be touched by the user, even when the position where the user touches the screen of the display section 14 is an outer-side of the subject frame, is appropriately referred to below as the touch acceptance frame.

For example, in FIG. 5, screen P17 of the display section 14 when the person mode is set as the imaging mode and screen P18 of the display section 14 when the pet mode is set as the imaging mode are shown.

Screens P17 and P18 are where a person and a dog are imaged and have the same configuration. In addition, in screens P17 and P18, a subject frame F14 with regard to the face of the person and a subject frame F15 with regard to the face of the dog are set as the same locations. In addition, in screens P17 and P18, a touch acceptance frame F16 with regard to the subject frame F14 and a touch acceptance frame F17 with regard to the subject frame F15 are shown with dashed lines. Here, the touch acceptance frames F16 and F17 are diagrammatically shown in order for description and are not shown in the display section 14.

As shown in screen P17, in the case where the imaging mode is the person mode, since the subject which is prioritized in imaging is the person, the touch acceptance frame F16 where there is the setting of the subject frame F14 of the face of the person which is the subject appropriate to the imaging mode is set to be larger than the touch acceptance frame F17 where there is the setting of subject frame F15 of the face of the dog.

On the other hand, as shown in screen P18, in the case where the imaging mode is the pet mode, since the subject which is prioritized in imaging is the animal, the touch acceptance frame F17 where there is the setting of the subject frame F15 of the face of the dog which is the subject appropriate to the imaging mode is set to be larger than the touch acceptance frame F16 where there is the setting of subject frame F14 of the face of the person.

In this manner, by setting the touch acceptance frame with a size according to the imaging mode, it is possible for the digital camera 11 to estimate the selection intention of the user even if the touch of the user is separated from the subject and to recognize the subject in accordance with the intention as the tracking subject.

In addition, as shown in screen P17, in regard to the person which is the subject, the spacing of the touch acceptance frame F16 with regard to the subject frame F14 is set so that the spacing on the lower side with regard to the subject frame F14 is wider than the spacing on the upper side, right side, and left side with regard to the subject frame F14. This is because, for example, in the case where the subject is the person, the capturing of the body of the person in the lower side of the subject frame (face frame) often occurs. In this manner, by setting the spacing on the lower side of the touch acceptance frame F16 with regard to the subject frame F14 to be wide, it is also possible to set the person as the tracking subject when the body of the person captured in the image is touched.

In addition, as shown in screen P17, in the case where the subject is the animal, the touch acceptance frame F17 is set so as to have equal spacing with regard to the subject frame F15. In this manner, in the digital camera 11, the size of the touch acceptance frame according to the type of the subject, specifically, the size of the touch acceptance frame according to the type of detector which detects the subject is set in advance.

Furthermore, the size of the subject frame is adjusted according to the size of the subject captured in the image and the size of the touch acceptance frame is adjusted according to the size of the subject frame.

Figure 6:
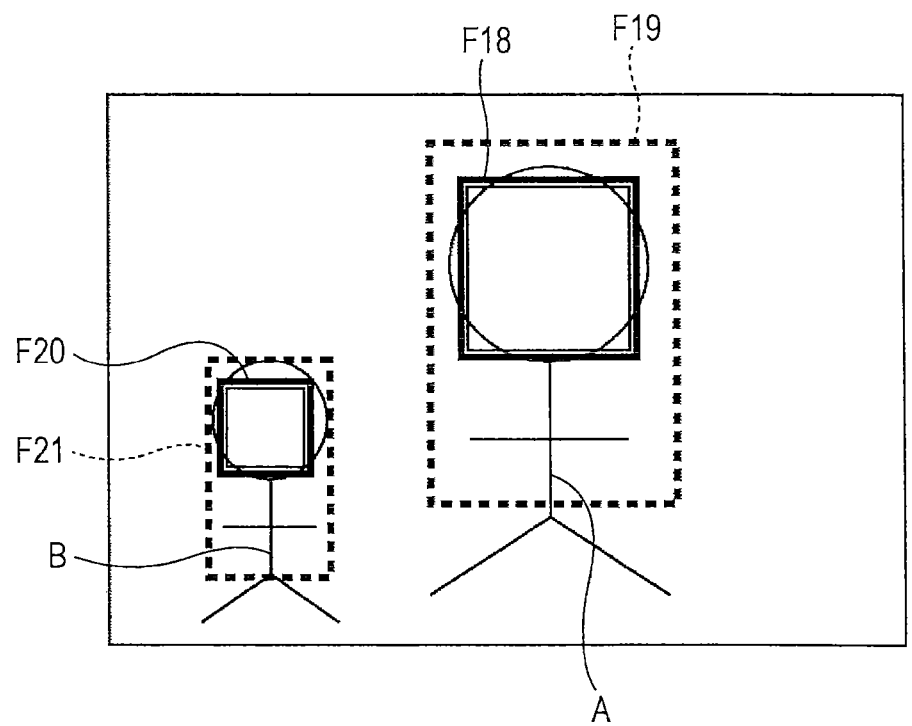
FIG. 6 is a diagram illustrating a setting example of a touch acceptance frame according to the size of a subject.

That is, as shown in FIG. 6, in a case where a subject A is captured as so to be larger than a subject B, a subject frame F18 which is set for the subject A is set to be larger than a subject frame F20 which is set for the subject B. In addition, a touch acceptance frame F19 which is set for the subject A is also set to be larger than a touch acceptance frame F21 which is set for the subject B.

In addition, the touch acceptance frame F19 is set so that the spacing (margin) on the lower side of the touch acceptance frame F19 with regard to the subject frame F18 is wider than the spacing on the upper side, right side, and left side, so as to include the body of the subject B. In the same manner, the touch acceptance frame F21 is set so that the spacing on the lower side with regard to the subject frame F20 is wide so as to include the body of the subject B.

Furthermore, the spacing of the touch acceptance frame with regard to the subject frame may be adjusted, for example, according to the movement of the subject, according to the context (scene) of the subject.

That is, as shown in FIG. 7, when the subject A is captured alone, when movement is detected where the subject B is approaching the subject A from the left side of the subject A, the spacing on the left side of the touch acceptance frame F19 (the subject B side) which is set for the subject A is adjusted so as to become narrower. After that, when movement where the subject B separates from the subject A is detected, the touch acceptance frame F19 is adjusted to return to the original spacing. Here, although not expressed in FIG. 7, the spacing on the subject A side of the touch acceptance frame F21 which is also set for the subject B is adjusted so as to become narrower as the subject B approaches the subject A and is adjusted to return to the original spacing when the subject B separates from the subject A.

Figure 8:
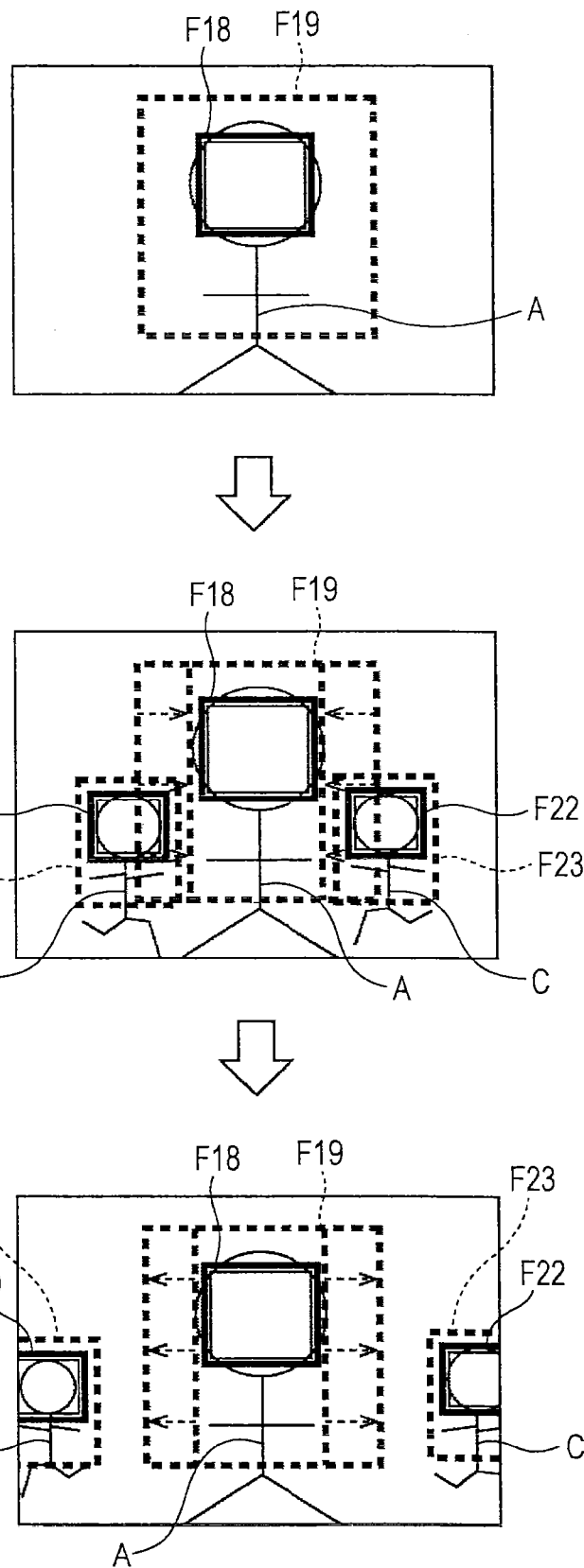
FIG. 8 is a diagram illustrating a setting example of a touch acceptance frame according to the movement of a subject.

In addition, for example, as shown in FIG. 8, when the subject A is captured alone, movement where the subject B is approaching the subject A from the left side of the subject A and movement where a subject C is approaching the subject A from the right side of the subject A are detected. In this case, the spacing on both sides of the touch acceptance frame F19 which is set for the subject A is adjusted so as to become narrower. After that, when movement where the subject B and the subject C separate from the subject A is detected, the touch acceptance frame F19 is adjusted to return to the original spacing. Here, the touch acceptance frame F21 which is set for the subject B and a touch acceptance frame F23 which is set for the subject C are adjusted according to the movement of the subject B and the subject C.

As is described with reference to FIGS. 5 to 8, the touch acceptance frame is set so as to surround a wider range than the subject frame, and the size of the touch acceptance frame is adjusted due to the imaging mode and the imaging scene (the size, type, movement, and the like of the subject).

Figure 9:
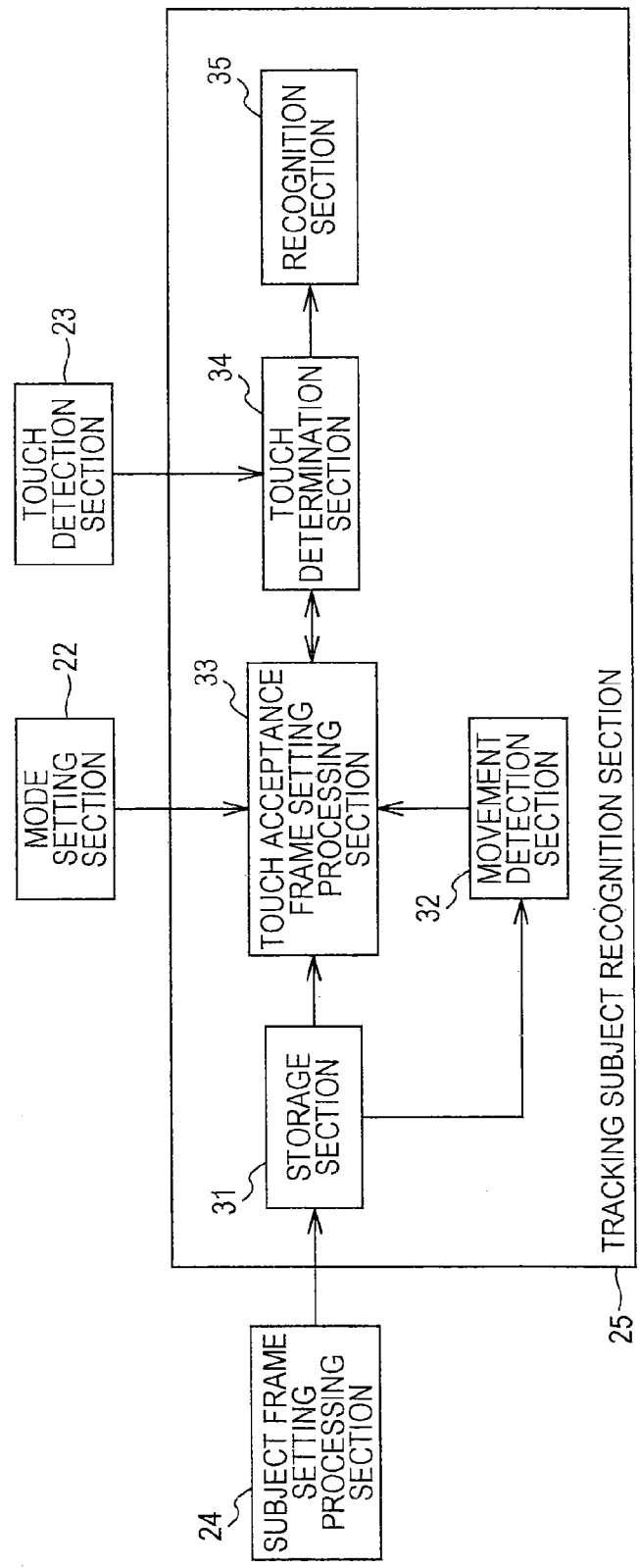
FIG. 9 is a block diagram illustrating a configuration example of a tracking subject recognition section.

Next, FIG. 9 is a block diagram illustrating a configuration example of the tracking subject recognition section 25 which sets the touch acceptance frame.

In FIG. 9, the tracking subject recognition section 25 is configured to be provided with a storage section 31, a movement detection section 32, a touch acceptance frame setting processing section 33, a touch determination section 34, and a recognition section 35.

In the storage section 31, information relating to the subject frame set by the subject frame setting processing section 24 is supplied, and information relating to the subject frame is stored in the storage section 31 for a predetermined period. In the information relating to the subject frame, information which shows the position and the size of the subject frame and information which shows the type of the detector which detects the subject are included.

The movement detection section 32 detects movement of the subject by determining a change in position of the subject frame in a predetermined period based on the information relating to the subject frame stored in the storage section 31.

The touch acceptance frame setting processing section 33 sets the touch acceptance frame with regard to the subject frame based on the imaging mode set by the mode setting section 22 and the information relating to the subject frame stored in the storage section 31. In addition, the touch acceptance frame setting processing section 33 adjusts the size of the set touch acceptance frame based on movement of the subject frame which is detected by the movement detection section 32.

When the information which shows the touch position touched by the user is supplied from the touch detection section 23, the touch determination section 34 determines whether or not the touch position is in the range of the touch acceptance frame which is set by the touch acceptance frame setting processing section 33. Then, in a case where it is determined that the touch position is in the range of the touch acceptance frame, the touch determination section 34 decides that the subject where the touch acceptance frame is set is the tracking subject and notifies the recognition section 35.

Here, in a case where it is determined that the touch position is not in the range of the touch acceptance frame, the touch determination section 34 operates the other detectors with regard to the subject frame setting processing section 24. For example, when only the face detector 28-1 is operated, there is a case where the user touches the subject other than the person, for example, the animal. At this time, it is determined that the touch position is not in the range of the touch acceptance frame, but by operating the animal detector 28-2 using the subject frame setting processing section 24, it is possible to detect the animal which is touched by the user and it is possible to recognize the animal as the tracking subject.

The recognition section 35 recognizes the tracking subject when there is notification of the tracking subject from the touch determination section 34 and outputs information which specifies the tracking subject.

Figure 10:
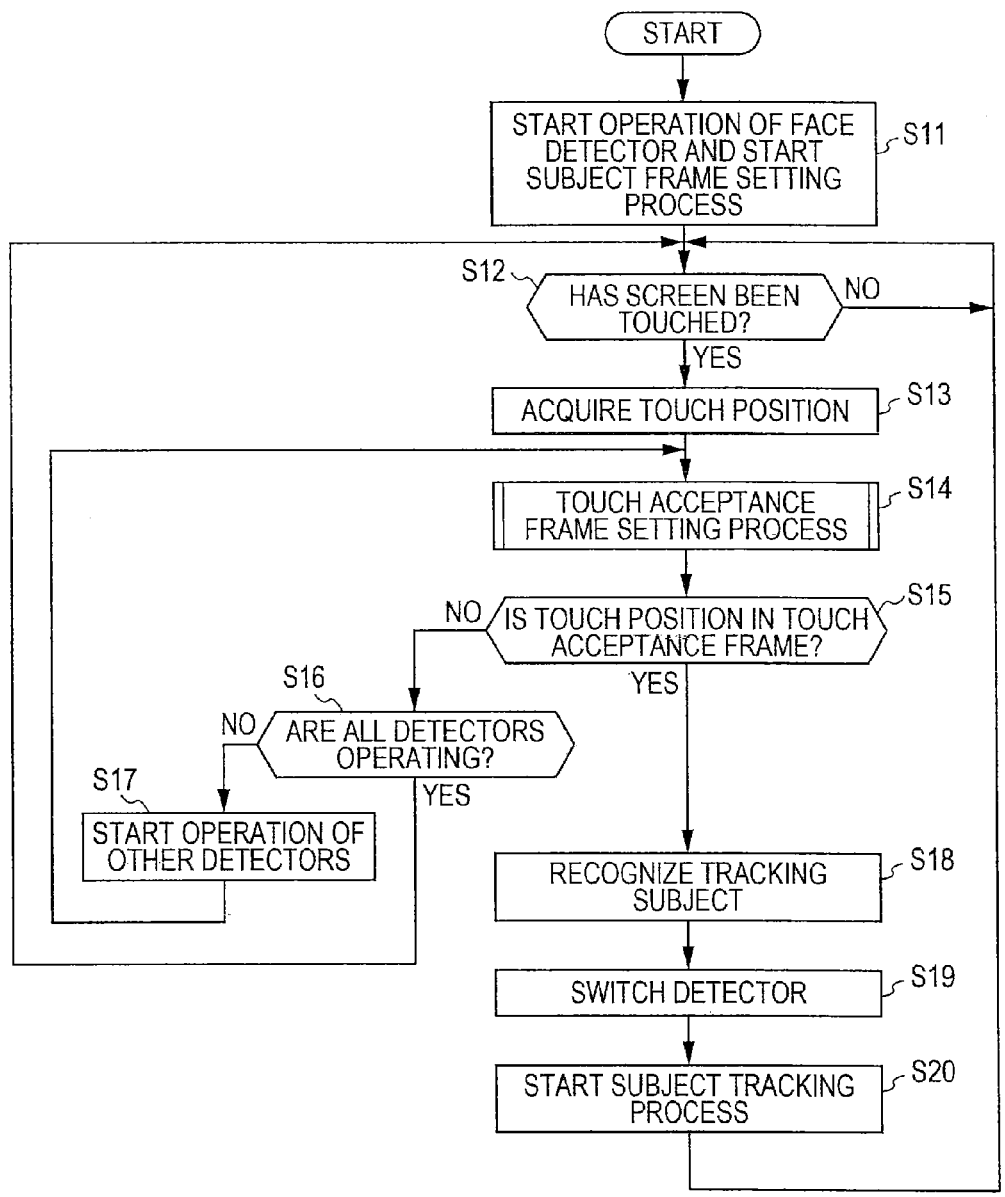
FIG. 10 is a flow chart describing a process of starting subject tracking.

Next, FIG. 10 is a flow chart describing a process where the digital camera 11 starts subject tracking.

For example, the process starts when the digital camera 11 is activated and the imaging using the imaging section 13 starts, and in step S11, the subject frame setting processing section 24 starts operating the face detector 28-1. Then, the subject frame setting processing section 24 starts the subject frame setting process where the subject frame (face frame) is set with regard to the face of the person which is detected from the image stored in the image memory 21, and the process progresses to step S12.

In step S12, the touch detection section 23 determines whether or not the user touches the screen of the display section 14 based on the signal from the touch panel of the display section 14. Then, the process waits until the touch detection section 23 determines that the user has touched the screen of the display section 14, and when it is determined that the user has touched the screen of the display section 14, the process progresses to step S13.

In step S13, the touch detection section 23 outputs the information (coordinates) which shows the touch position touched by the user to the tracking subject recognition section 25 and the tracking subject recognition section 25 acquires the touch position.

After the process of step S13, the process progresses to step S14, the touch acceptance frame setting process (refer to FIG. 11 described later) is performed, and the touch acceptance frame is set with regard to the subject frame. After the process of the touch acceptance frame setting process, the process progresses to step S15.

In step S15, in the tracking subject recognition section 25, the touch determination section 34 determines whether or not the touch position is in the range of the touch acceptance frame based on the touch position acquired in step S13.

In a case where it is determined in step S15 that the touch position is not in the range (outside of the range) of the touch acceptance frame, the process progresses to step S16, and the touch determination section 34 determines whether or not all of the detectors of the subject frame setting processing section 24 are operating.

In a case where it is determined in step S16 that not all of the detectors of the subject frame setting processing section 24 are operating, the process progresses to step S17.

In step S17, the touch determination section 34 requests operation of the detectors other than the detectors which are operating with regard to the subject frame setting processing sector 24. In accordance with this, the subject frame setting processing section 24 starts the operation of the other detectors, the process returns to step S14, and below, the process is repeated in the same manner. That is, the detection of the subject using the detectors which have begun operating is performed, the subject frame is set when the subject is newly detected, and the touch acceptance frame is newly set with regard to the subject frame.

On the other hand, in a case where it is determined in step S16 that all of the detectors of the subject frame setting processing section 24 are operating, the process returns to step S12, and below, the process is repeated in the same manner. That is, in this case, it is not possible for the tracking subject to be recognized with regard to the touch of the user, and the detection of a new touch is awaited. Here, in this case, that it was not possible to recognize the tracking subject may be displayed on the display section 14.

On the other hand, in a case where it is determined in step S15 that the touch position is in the range of the touch acceptance frame, the process progresses to step S18.

In step S18, the recognition section 35 recognizes the subject, which is set in the touch acceptance frame in which the touch position is in the range, as the tracking subject and acquires the color and luminance in the subject frame set for the subject. Then, the recognition section 35 supplies information, which includes information which shows the position of the tracking subject, and information which shows the color and the luminance of the tracking subject and the like and which specifies the tracking subject, to the detector switching section 26.

After the process of step S18, the process progresses to step S19, the detector switching section 26 performs a process of recognizing the detector which detects the tracking subject and switching the detector with regard to the subject tracking processing section 27 so as to use the detector in the subject tracking process. In addition, the detector switching section 26 supplies the information which specifies the tracking subject to the subject tracking processing section 27 and the process progresses to step S20.

In step S20, the subject tracking processing section 27 uses the detector switched in step S18 and the subject tracking process where the tracking subject is tracked starts based on the information which specifies the tracking subject. After the process of step S20, the process returns to step S12, the process waits until the user touches the next subject, and below, the process is repeated in the same manner.

As above, in the digital camera 11, when the region in an inner side of the touch acceptance frame is touched, since the subject which is set in the touch acceptance frame is recognized as the tracking subject, it is possible for the subject to be recognized with precision even when the touch position of the user is outside of the subject frame.

In addition, in the case where the position touched by the user is outside of the range of the touch acceptance frame, by operating the other detectors, it is possible to detect the subject even when the detector for detecting the subject which the user wants as the tracking target is not operating. According to this, when setting the subject which is the tracking target, it is possible to improve the convenience of use for the user.

That is, in the case where the imaging mode is the person mode and only the face detector 28-1 is operating, when the user touches the animal which is displayed in the display section 14, the operation of the animal detector 28-2 automatically starts and the animal is recognized as the tracking subject. In this manner, it is no bother for the user to change the imaging mode to the animal mode and it is possible to start the subject tracking process with the animal as the tracking subject.

In addition, when the plurality of detectors is operated, the tracking subject is recognized, and the subject tracking process is started in this manner, it is possible for the detector switching section 26 to stop the operation of the detectors other than the detector used in the detection of the tracking subject. According to this, it is possible to reduce the processing which is executed in the image processing section 16, and for example, it is possible to suppress the use of power.

Figure 11:
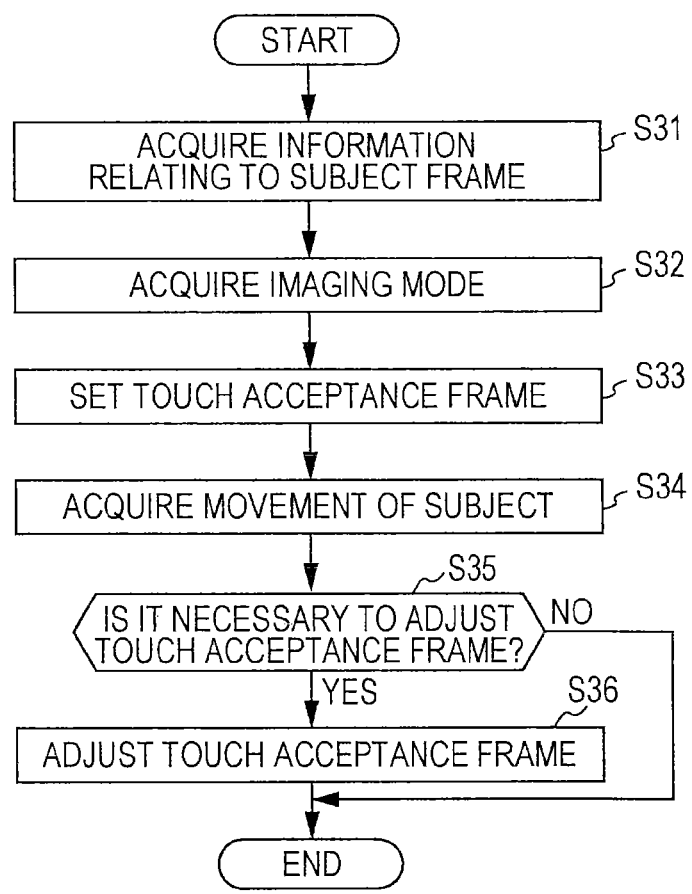
FIG. 11 is a flow chart describing a touch acceptance frame setting process.

Next, FIG. 11 is a flow chart describing the touch acceptance frame setting process of step S14 of FIG. 10.

In step S31, the touch acceptance frame setting processing section 33 reads out and acquires the information, which relates to the subject frame displayed in the display section 14 at a timing when the touch determination section 34 acquires the touch position, from the storage section 31.

After the process of step S31, the process progresses to step S32, the touch acceptance frame setting processing section 33 references the mode setting section 22, the imaging mode which is currently set is acquired, and the process progresses to step S33.

In step S33, the touch acceptance frame setting processing section 33 recognizes the type of the subject where the subject frame is set based on the information relating to the subject frame acquired in step S31. Then, the touch acceptance frame setting processing section 33 sets the touch acceptance frame with regard to the subject frame in a size which is a standard registered in advance based on the type of the recognized subject and the imaging mode acquired in step S32.

Here, in the touch acceptance frame setting processing section 33, the size, which is the standard of the touch acceptance frame with regard to the size of the subject frame, is registered in advance. In addition, the size of the touch acceptance frame with regard to the subject frame differs in accordance with the type of the subject for each of the imaging modes as described with reference to FIG. 5, and in the touch acceptance frame setting processing section 33, the size, which is the standard of the touch acceptance frame with regard to the subject frame, is registered for each of the imaging modes.

After the process of step S33, the process progresses to step S34, the touch acceptance frame setting processing section 33 references the movement detection section 32 and acquires the movement of the subject, and in step S35, it is determined whether or not it is necessary to adjust the touch acceptance frame set to the size which is the standard.

As described with reference to FIGS. 7 and 8 above, in the case where movement is detected where subjects approach each other, the touch acceptance frames are adjusted so that the spacing of the touch acceptance frames with regard to the subject frame on the opposing sides of each of the subjects become narrower. In addition, in the case where movement is detected where subjects which are close to each other separate, the touch acceptance frame is adjusted so that the narrowed spacing is widened. Accordingly, the touch acceptance frame setting processing section 33 determines whether it is necessary to adjust the touch acceptance frame in the case where movement of the subjects is detected in this manner.

In a case where it is determined in step S35 that it is necessary to adjust the touch acceptance frame, the process progresses to step S36, the touch acceptance frame setting processing section 33 adjusts the touch acceptance frame according to movement of the subject, and the process is completed.

On the other hand, in a case where it is determined in step S35 that it is not necessary to adjust the touch acceptance frame, the process skips step S36 and is completed.

As above, since the touch acceptance frame setting processing section 33 sets the size of the touch acceptance frame according to the imaging mode, it is possible for the subject which is prioritized and imaged in each of the imaging modes to be recognized as the tracking subject with priority.

In addition, the touch acceptance frame setting processing section 33 adjusts the touch acceptance frame according to the imaging scene (that is, the context of the imaged image), more specifically, according to characteristics of the subject captured in the image (type, size, and the like), movement of the subject relative to each other, or the like. According to this, it is possible to recognize the subject which is appropriate for each of the imaging scenes as the tracking subject with priority.

In this manner, since the appropriate touch acceptance frame is set based on the imaging mode and the imaging scene, it is possible to recognize the subject which the user wants as the tracking target with precision.

In addition, in a case where the subjects move, there are cases where the position which the user touches and the position where the subject is captured do not match, and there are cases where the subject, which differs from the intention of the user, is recognized as the tracking subject and the subject tracking process is performed. With regard to this, in the digital camera 11, since the range of the touch acceptance frame changes according to the movement of the subject, it is possible to avoid the subject which differs from the intention of the user being recognized as the tracking subject and touching is not repeated a plurality of times in order for the user to select the correct subject. That is, since it is possible for the subject to be selected with precision using a simple operation, it is possible to reduce the burden on the user.

Here, it is possible for the digital camera 11 to be provided with the imaging mode other than the person mode and the pet mode described above, and for the subject frame setting processing section 24 and the tracking subject recognition section 25 to set the subject frame and the touch acceptance frame for the subject which is prioritized in imaging for each of the imaging modes. For example, the digital camera 11 is provided with a child prioritizing mode which performs imaging with imaging conditions which are appropriate for imaging children, an adult prioritizing mode which performs imaging with imaging conditions which are appropriate for imaging adults, or the like.

Figure 12:
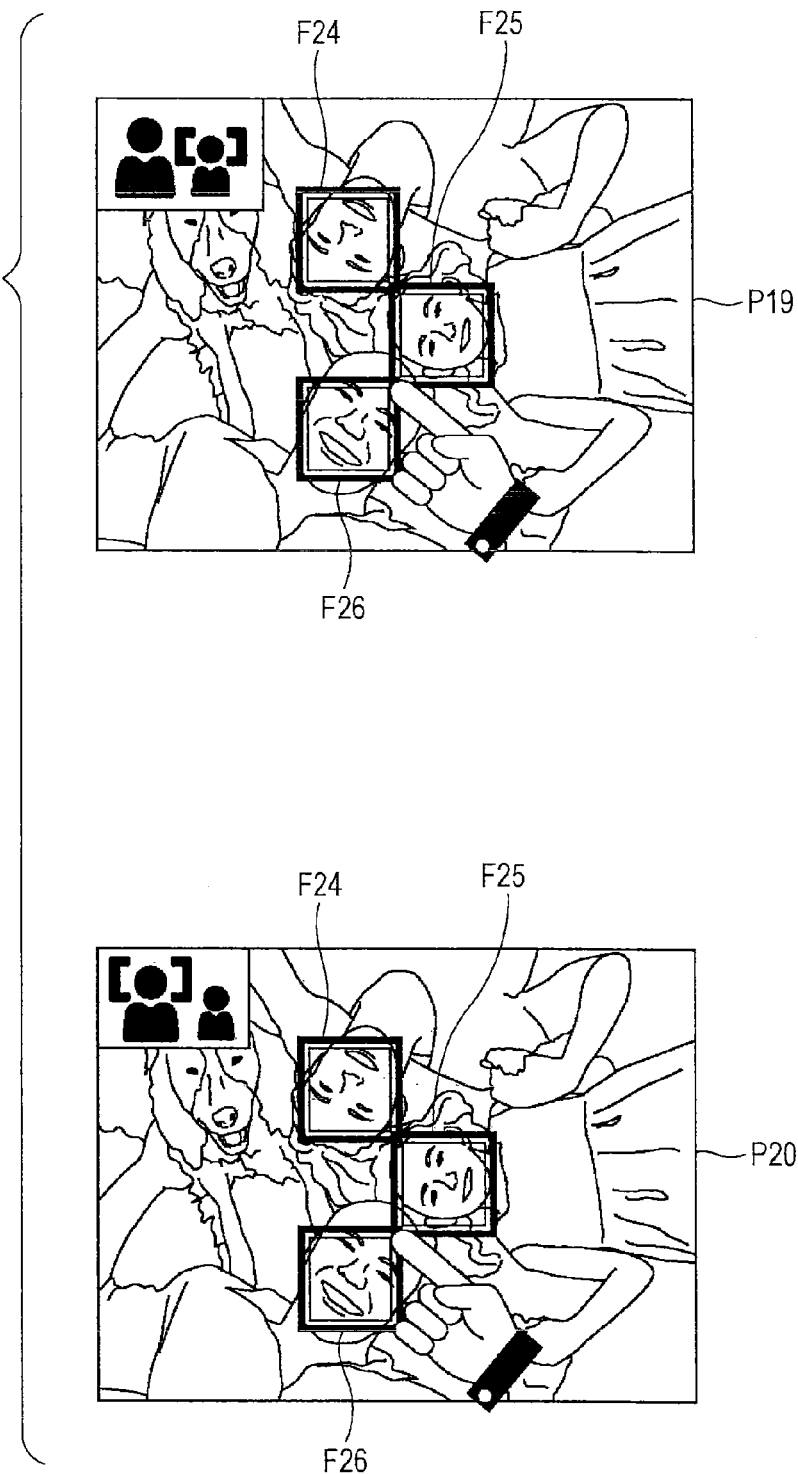
FIG. 12 is a diagram describing an example where a tracking subject is recognized according to an imaging mode.

Screen P19 of the display section 14 when the child prioritizing mode is set as the imaging mode and screen P20 of the display section 14 when the adult prioritizing mode is set as the imaging mode are shown in FIG. 12.

Screens P19 and P20 have the same configuration where two children and one adult are captured, subject frames F24 and F25 are displayed for the faces of the children and a subject frame F26 is displayed for the face of the adult. With regard to screens P19 and P20 such as these, there is a case where the position where the user touches the screen of the display section 14 is between the subject frames F25 and F26 in the same manner as the tip of the finger mark shown in screens P19 and P20.

In this case, if the imaging mode is the child prioritizing mode, the child which is set with the subject frame F25 is recognized as the tracking subject, and if the imaging mode is the adult prioritizing mode, the adult which is set with the subject frame F26 is recognized as the tracking subject. In this manner, in the digital camera 11, it is possible for the intention of the user to be estimated by referencing the imaging mode even when the touch position of the user is between the subject frames F25 and F26 and for the tracking subject to be recognized with precision.

In addition, the digital camera 11 is provided with the imaging modes such as an underwater mode, a food mode, a flower mode, or the like, the subject frame is set with regard to the subject that is appropriate for each of the imaging modes, and the touch acceptance frame is adjusted. That is, other than the face detector 28-1 and the animal detector 28-2 shown in FIG. 1, it is possible for the subject frame setting processing section 24 to be provided with a fish detector, a food detector, a flower detector, or the like. As the animal detector 28-2, there may be a dog face detector and a cat face detector. In addition, the digital camera 11 may be provided with a scenery mode, a night scene mode, or the like as the imaging mode.

Here, other than being set by the user operating the digital camera 11, it is possible for the imaging modes to be automatically set so as to perform optimal imaging according to the imaging context by analyzing the image in the digital camera 11.

In addition, in the embodiment, it is described that the face detector 28-1 is normally operating, but there may be a state where the detector is not normally operating in this manner and the subject frame is not displayed on the display section 14 before being touched by the user. That is, the operation of the detectors may be started at a timing when there is a touch by the user.

Here, in the embodiment, the subject to be tracked is selected by the user touching the screen of the display section 14, but the subject may be selected by another means, for example, by operation of operation keys. In addition, the subject may be selected by using a guide frame for matching the subject with the angle of view in advance.

Here, other than the digital camera such as a digital still camera, a digital video camera, or the like, it is possible to apply the disclosure to a device which is provided with an imaging function such as a mobile phone device, a personal computer, or the like.

It is possible for the series of processes described above to be executed by using hardware and is possible for the series of processes described above to be executed by using software. In a case where the series of processes is executing using software, a program which configures the software is installed from a program recording medium to a computer which has specialized hardware built in, or by installing each type of program, to, for example, a generalized personal computer which is able to execute each type of function.

FIG. 13 is a block diagram illustrating a configuration example of hardware of a computer which executes the series of processes described above using a program.

In the computer, a CPU (Central Processing Unit) 101, ROM (Read Only Memory) 102, and a RAM (Random Access Memory) 103 are connected to each other by a bus 104.

In the bus 104, an input and output interface 105 is further connected. In the input and output interface 105, an input section 106 formed by a keyboard, a mouse, a microphone, or the like, an output section 107 formed by a display, a speaker, or the like, a storage section 108 formed by a hard disk, a nonvolatile memory, or the like, a communication section 109 formed by a network interface or the like, a drive 110 which drives a magnetic disk, an optical disc, a magneto-optical disc, or a removable medium 111 such as a semiconductor memory or the like, are connected.

In the computer configured as above, the CPU 101 performs the series of processes described above by, for example, executing the loading of the program stored in the storage section 108 in the RAM 103 via the input and output interface 105 and the bus 104.

The program executed by the computer (CPU 101) is, for example, recorded in a magnetic disk (including a flexible disk), an optical disc (a CD-ROM (Compact Disc-Read Only Memory), a DVD (Digital Versatile Disc), or the like), a magneto-optical disc, or the removable medium 111 formed by a semiconductor memory or the like such as a package medium, or is provided via a wired or wireless transmission medium such as a local area network, the internet, or digital satellite broadcasting.

Then, it is possible to install the program in the storage section 108 via the input and output interface 105 by mounting the removable medium 111 in the drive 110. In addition, it is possible to receive the program using the communication section 109 via the wired or wireless transmission medium and install the program in the storage section 108. Alternatively, it is possible to have the program installed in advance in the ROM 102 or the storage medium 108.

Here, the program executed by the computer may be a program which performs the processes in a time series in the sequence described in the specifications or may be a program which performs the processes in parallel or at a necessary timing such as when a request is performed. In addition, the program may be processed using one CPU or may be distributed and processed using a plurality of CPUs.

The present disclosure contains subject matter related to that disclosed in Japanese Priority Patent Application JP 2010-151951 filed in the Japan Patent Office on Jul. 2, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising:
circuitry configured to
   detect a subject captured in an image;
   set a subject frame which surrounds a predetermined range of the subject detected from the image;
   set, but not display, an acceptance frame with a range wider than the subject frame according to a context of the image;
   detect a specified position on an image corresponding to a received user input;
   recognize the subject as a tracking target in response to a determination that the detected specified position corresponding to the received user input corresponds to a location within the acceptance frame;
   detect a plurality of types of subjects; and
   detect other types of subjects when the circuitry is unable to recognize a subject which is the tracking target.

2. The electronic device of claim 1, further comprising:
a touch panel display configured to
   display the image and the subject frame; and
   receive a touch input as the user input.

3. The electronic device of claim 2, wherein
the circuitry is configured to recognize the subject as a tracking target by determining that the detected specified position corresponding to the received touch input received at the touch panel display corresponds to a position within the acceptance frame.

4. The electronic device of claim 1, wherein
the acceptance frame covers an area larger than the subject frame and includes an entirety of the subject frame.

5. The electronic device of claim 1, wherein
the circuitry is configured to set a size of the acceptance frame according to a size of the subject detected in the image.

6. The electronic device of claim 1, wherein
the circuitry is configured to set a spacing of the acceptance frame with regard to the subject frame according to a type of the subject detected in the image.

7. An electronic device comprising:
circuitry configured to
   detect a subject captured in an image;
   set a subject frame which surrounds a predetermined range of the subject detected from the image;

set, but not display, an acceptance frame with a range wider than the subject frame according to a context of the image;

detect a specified position on an image corresponding to a received user input;

recognize the subject as a tracking target in response to a determination that the detected specified position corresponding to the received user input corresponds to a location within the acceptance frame; and adjust a spacing of the acceptance frame with regard to the subject frame according to movement of the subject detected in the image.

8. An electronic device comprising:

circuitry configured to detect a subject captured in an image;

set a subject frame which surrounds a predetermined range of the subject detected from the image;

set, but not display, an acceptance frame with a range wider than the subject frame according to a context of the image;

detect a specified position on an image corresponding to a received user input;

recognize the subject as a tracking target in response to a determination that the detected specified position corresponding to the received user input corresponds to a location within the acceptance frame; and set the acceptance frame of the subject which is appropriate for an imaging mode which is currently set to be larger than the acceptance frame of the subject which is not appropriate for the imaging mode when a plurality of types of the subjects are detected in the image.

9. A method performed by an electronic device, the method comprising:

detecting, by circuitry of the electronic device, a subject captured in an image;

setting, by the circuitry, a subject frame which surrounds a predetermined range of the subject detected from the image;

setting, but not displaying, by the circuitry, an acceptance frame with a range wider than the subject frame according to a context of the image;

detecting, by the circuitry, a specified position on an image corresponding to a received user input;

recognizing, by the circuitry, the subject as a tracking target in response to a determination that the detected specified position corresponding to the received user input corresponds to a location within the acceptance frame;

detecting, by the circuitry, a plurality of types of subjects; and detecting, by the circuitry, other types of subjects when the circuitry is unable to recognize a subject which is the tracking target.

10. A non-transitory computer-readable medium including computer-program instructions, which when executed by an electronic device, cause the electronic device to:

detect a subject captured in an image;

set a subject frame which surrounds a predetermined range of the subject detected from the image;

set, but not display, an acceptance frame with a range wider than the subject frame according to a context of the image;

detect a specified position on an image corresponding to a received user input; and recognize the subject as a tracking target in response to a determination that the detected specified position corresponding to the received user input corresponds to a location within the acceptance frame;

detect a plurality of types of subjects; and detect other types of subjects when the circuitry is unable to recognize a subject which is the tracking target.

* * * * *